(12) United States Patent
Van Esbroeck et al.

(10) Patent No.: US 12,329,169 B2
(45) Date of Patent: Jun. 17, 2025

(54) DESKINNING DEVICE, SYSTEM AND METHOD FOR REMOVING SKIN FROM A POULTRY LEG PRODUCT

(71) Applicant: Marel Poultry B.V., Av Boxmeer (NL)

(72) Inventors: Maurice Eduardus Theodorus Van Esbroeck, Ar Bemmel (NL); Jan Willem Bos, NL Haps (NL)

(73) Assignee: Marel Poultry B.V., Av Boxmeer (NL)

( * ) Notice: Subject to any disclaimer, the term of this patent is extended or adjusted under 35 U.S.C. 154(b) by 50 days.

(21) Appl. No.: 18/256,780

(22) PCT Filed: Dec. 17, 2021

(86) PCT No.: PCT/EP2021/086434
§ 371 (c)(1),
(2) Date: Jun. 9, 2023

(87) PCT Pub. No.: WO2022/129488
PCT Pub. Date: Jun. 23, 2022

(65) Prior Publication Data
US 2024/0016167 A1    Jan. 18, 2024

(30) Foreign Application Priority Data
Dec. 17, 2020   (NL) ...................................... 2027139

(51) Int. Cl.
*A22C 21/00*    (2006.01)
(52) U.S. Cl.
CPC ...... *A22C 21/0092* (2013.01); *A22C 21/0053* (2013.01)
(58) Field of Classification Search
CPC ......................... A22C 21/0092; A22C 21/0053
(Continued)

(56) References Cited

U.S. PATENT DOCUMENTS 4,459,721 A * 7/1984 Hill ..................... A22C 21/0092
99/585
5,186,680 A * 2/1993 Conaway ........... A22C 21/0092
452/125
(Continued)

FOREIGN PATENT DOCUMENTS

CN    203542657 U    4/2014
EP    0519570 A1    12/1992
(Continued)

OTHER PUBLICATIONS

Netherlands Search Report issued in Netherlands Application No. NL2027139 mailed on Sep. 3, 2021 (9 pages).
(Continued)

*Primary Examiner* — Richard T Price, Jr.
(74) *Attorney, Agent, or Firm* — Osha Bergman Watanabe & Burton LLP

(57) ABSTRACT

Deskinning device for removing skin from a poultry leg product, comprising a first leg end which comprises at least a part of an ankle joint, and a second leg end opposite to the first leg end, the first leg end being arranged at a higher level than the second leg end, wherein the device comprises at least one skin removal assembly which is adapted to carry out a deskinning process, a first skinning roller rotatable about an axis of rotation, wherein a first roller end is arranged at a higher level than a second roller end, a counter skinning member arranged adjacent said first skinning roller, a gap between the first skinning roller and the counter skinning member, wherein the skin removal assembly is adapted to pull the skin of the poultry leg product into the gap and towards the first roller end.

15 Claims, 6 Drawing Sheets

Figure 1A:
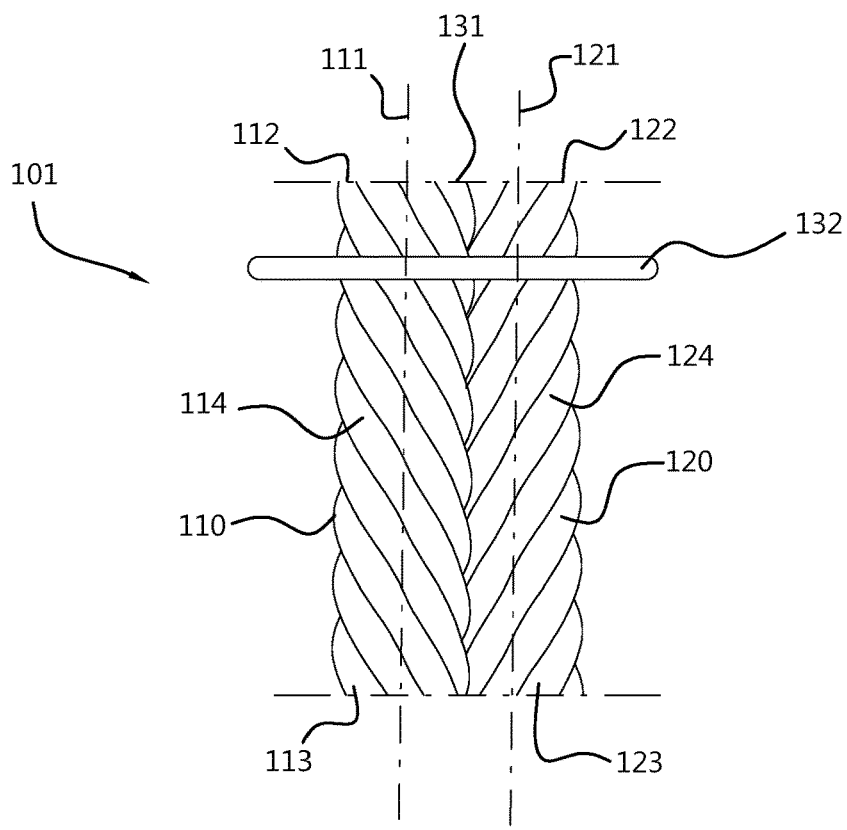

(58) Field of Classification Search
USPC .......................................................... 452/125
See application file for complete search history.

(56) References Cited

U.S. PATENT DOCUMENTS

| | | | | |
|---|---|---|---|---|
| 5,505,657 | A * | 4/1996 | Janssen .............. | A22C 21/0053 |
| | | | | 452/179 |
| 7,059,954 | B2 * | 6/2006 | Annema ............ | A22C 21/0092 |
| | | | | 452/136 |
| 2010/0221991 | A1 * | 9/2010 | Hagendoorn ...... | A22C 21/0092 |
| | | | | 452/125 |
| 2016/0270413 | A1 | 9/2016 | Bos et al. | |
| 2019/0142021 | A1 * | 5/2019 | Van Hillo .......... | A22C 21/0092 |
| | | | | 452/128 |

FOREIGN PATENT DOCUMENTS

| | | | |
|---|---|---|---|
| EP | 2818049 | A1 | 12/2014 |
| WO | 200059311 | A2 | 3/2001 |
| WO | 200339262 | A2 | 5/2003 |
| WO | 201572851 | A1 | 5/2015 |

OTHER PUBLICATIONS

International Search Report issued in International Patent Application No. PCT/EP2021/086434 mailed on Feb. 18, 2022 (5 pages).
Written Opinion issued in International Patent Application No. PCT/EP2021/086434 mailed on Feb. 18, 2022 (8 pages).
Office Action issued in corresponding Chinese Application No. 202180083374.2, dated Mar. 28, 2025 (8 Pages).

* cited by examiner

DESKINNING DEVICE, SYSTEM AND METHOD FOR REMOVING SKIN FROM A POULTRY LEG PRODUCT

The present invention relates to the field of deskinning poultry leg products, and pertains in particular a deskinning device, system and method for deskinning a poultry leg product.

Several devices for automatically deskinning poultry leg products are known in the art. For example, WO 2015/072851 A1 discloses a carousel device that receives a poultry leg product in which a transverse cut has been made. The poultry leg is suspended by the ankle joint. The device comprises a plurality of skin removal assemblies having two rotatable rollers, which pull the skin downwards with a downwards force.

In EP 519 570 a system for skin removal from defeathered whole leg poultry products is disclosed. This known system comprises a poultry products conveyor with a track and a series of poultry product carriers which are spaced apart from one another in the direction of the track and which are movable along said track. Each poultry product carrier is adapted to hold a defeathered whole leg poultry product at the ankle joint thereof, also called tarsal joint, such that the poultry product is conveyed hanging from said carrier. In EP 519 570 it is explained that the poultry product may be passed along a cutting device arranged along the track of the poultry products conveyor in order to make one or more incisions and then along a skin removal device arranged along the track of the poultry products conveyor in order to remove skin from the poultry products held and conveyed by the poultry products conveyor. The thigh skin is stripped downwards from the leg by movement of a pair of helical rollers.

WO00/59311 discloses in particular with reference to FIGS. 6, 7, and 8 therein a similar system as discussed with reference to EP 519 570. In this prior art document it is discussed that drumstick poultry products, in particular of chicken, are conveyed whilst hanging from a carrier. Each carrier carries two drumsticks in side-by-side arrangement; first along a cutting device that makes a cut in each drumstick near the ankle joint and then along a skin removal device. As in EP 519 570 this device has two skin removal assemblies that each comprises two rotary driven skinning rollers having an axis of rotation and being driven in opposite directions so that the skin is gripped in the nip between the rollers and pulled from the drumstick in a direction away from the ankle joint. The skinning rollers of each assembly are arranged with their axes of rotation parallel to the track of the conveyor in a substantially horizontal orientation.

It has been found that the prior art devices do not always have satisfactory results. For example, the skin may not be completely removed from the poultry leg product, the skin may break or tear at an undesired location, or the resulting meat product may not be visually pleasing.

The object of the present invention is to provide an improvement or at least alternative for the known devices and methods.

This object is achieved with the deskinning device according to the invention, which is a deskinning device for removing skin from a poultry leg product, which poultry leg product comprises a first leg end which comprises at least a part of an ankle joint, and a second leg end opposite to the first leg end, wherein the first leg end is arranged at a higher level than the second leg end, wherein the device comprises at least one skin removal assembly which is adapted to carry out a deskinning process, wherein the skin removal assembly comprises:

a first skinning roller which is rotatable about an axis of rotation which extends in a longitudinal direction of the first skinning roller, which first skinning roller further comprises a first roller end and a second roller end, wherein the first roller end is arranged at a higher level than the second roller end, a counter skinning member which is arranged adjacent said first skinning roller, a gap between the first skinning roller and the counter skinning member, wherein the skin removal assembly is adapted to pull the skin of the poultry leg product into the gap and towards the first roller end.

The poultry leg product may e.g. be a drumstick or a whole leg poultry product. In the technical field, a whole leg poultry product is a commonly accepted term to identify a poultry leg formed by the drumstick and the thigh connected to the drumstick. Other terms used for this product are anatomical leg and separated leg. In general, the poultry leg product is defeathered. The poultry leg product is arranged with a first leg end at a higher level than a second leg end. For example, the poultry leg product may be suspended by a part of an ankle joint, also referred to as tarsal joint, in a carrier.

The deskinning device comprises at least one skin removal assembly. Optionally, the deskinning device comprises a plurality of skin removal assemblies, which may optionally be arranged in a carrousel arrangement. However, it is also possible to provide one or a plurality of skin removal assemblies in a linear arrangement.

The skin removal assembly has a first skinning roller having a first roller end, which is arranged at a higher level than a second roller end. A counter skinning member is arranged adjacent of the first skinning roller for forming a gap therein between. The counter skinning member may e.g. also be a rotatable roller, but may also be a stationary component such as a shoe or pinch block. By rotation about an axis of rotation in a longitudinal direction, the first skinning roller is able to grab the skin and pull the skin from the poultry leg product into the gap. For example, the first skinning roller may comprise protrusions, e.g. grooves or teeth, e.g. straight or helical, for gripping the skin. In accordance with the invention, the skin is pulled towards the first roller end. For example, the first skinning roller and/or the counter skinning member may be adapted to pull the skin towards the first roller end. This may e.g. be achieved by arranging the protrusions accordingly, and/or arranging the first skinning roller and/or counter skinning member in a tilted position and/or at least partly above the poultry leg product.

Since the first roller end is arranged above the second roller end, the skin is pulled upwards. For example, the skin may be pulled towards the ankle joint of the poultry leg product. It has been found that the invention provides in a better skin removal, because the skin can easier be pulled loose in this direction. The skin may also be removed in a more predictable manner that with prior art devices. In addition, the invention allows to omit preparatory cuts or incisions, which may damage the meat.

In an embodiment, the skin removal assembly further comprises a skin-tightening element which is adapted to cause a skin connection—between skin remaining on the poultry leg product and a skin part loosened from the poultry leg product and being pulled towards the first roller end past a predetermined tightening point—to be pulled tight, which skin-tightening element is arranged closer to the first roller end than to the second roller end. For example, tightening point may be in or adjacent to the gap. For example, the tightening point may be between first roller end and second roller end next to first roller or in gap.

For example, the skin-tightening element may be or comprise a plate, bar and/or rod, which plate, bar and/or rod extends into a direction perpendicular to the longitudinal direction of the first skinning roller.

Whereas the skin part that has already been loosened from the poultry leg product is being moved away by the first skinning roller, skin remaining on the poultry leg product is still attached to the poultry leg product. The skin connection is as such guided by the skin-tightening element. Due to the skin-tightening element, the skin is held relatively tight. This has been found to result in better skin removal. In particular, this embodiment allows to deskin the poultry leg product in more predictable way, and allows to completely detach the loosened skin without the risk of making a cut or incision into the meat still remaining on the poultry leg product.

In an embodiment, the skin removal assembly further comprises a skin cutter which comprises a cutting edge, which cutting edge is arranged closer to the first roller end than to the second roller end of the first skinning roller. For example, the skin cutter may be a knife or blade. For example, the skin cutter may be stationary, or rotatable and/or translationally moveable by means of a skin cutter drive. This embodiment allows to omit additional processing devices for making preparatory incisions such as are commonly used in the prior art.

The poultry leg product may comprise a skin part, a leg bone and leg meat which is naturally present on said leg bone. The skin part has an inner surface which before deskinning process engages the leg meat and/or the leg bone and during the deskinning process becomes disengaged from the leg meat and/or leg bone, respectively.

In a further embodiment, the cutting edge of the skin cutter is arranged relative to the first skinning roller such that the cutting edge engages the skin part during the deskinning process after the inner surface has become detached from the leg meat and/or leg bone, respectively, e.g. at a skin connection between skin remaining on the poultry leg product and a skin part loosened from the poultry leg product. Advantageously, the skin cutter can be used to cut the skin, that has already been loosened by the first skinning roller, such that it is completely detached from the poultry leg product. This allows to omit cutting devices which make preparatory incision such as the prior art documents. By cutting after the skin already has been pulled loose, a cleaner cut can be achieved and the resulting meat product is more pleasing to the eye of the customer. In addition, the risk of cutting into meat has significantly been reduced.

For example, the cutting edge of the skin cutter may be arranged at a distance of the poultry leg product. As such, the cutting edge only cuts through the skin and not in the meat, and the resulting meat part is more pleasing to the eye as is not damaged by a skin cutter.

In an embodiment, the skin cutter and the skin-tightening element are arranged adjacent to each other. The skin-tightening element may make sure the skin is held tight, which improves the cutting by the skin cutter.

In an embodiment, the axis of rotation of the first skinning roller extends in a direction which is at an angle relative to the vertical, which angle is preferably 45° or less. This inclined orientation allows for enhanced engagement of the poultry leg product with the first skinning roller.

In an embodiment, the skin removal assembly further comprises a pressing device adapted to cause a contact pressure between the poultry leg product and the skinning roller and/or the counter skinning member. As such, it can be ensured that skin is removed from the poultry leg product. For example, the pressing device may be adapted to engage the poultry leg product, e.g. from a side opposite of a side of the poultry leg product which the first skinning roller engages. For example, the pressing device may comprise a moveable pressing surface which is actuated by a pressing device actuator and presses the poultry leg product by engaging it. For example, the pressing device may comprise a stationary guide, rod, or plate with which the poultry leg product come into contact as the poultry leg product is conveyed, e.g. by a carrier, towards the first skinning roller, wherein said stationary guide, rod, or plate biases the poultry leg product towards the first skinning roller.

In an embodiment, the counter skinning member is a second skinning roller which is rotatable about an axis of rotation which extends in a longitudinal direction of the second skinning roller, and wherein preferably the axis of rotation of the first skinning roller and the axis of rotation of the second skinning roller are parallel to each other, and wherein optionally at least one of the first skinning roller and the second skinning roller is provided with a gripper ridge. The usage of two skinning rollers advantageously enables better skin removal.

For example, the second skinning roller may comprise protrusions, e.g. grooves or teeth, e.g. straight or helical, for gripping the skin. For example, the first skinning roller and the second skinning roller may have meshing teeth. For example, the first skinning roller and the second skinning roller may be adapted to rotate in opposite direction.

In an embodiment, the first skinning roller and/or second skinning roller have a conical shape, in which case their respective exes of rotation possibly are not parallel.

In an embodiment, the skin removal assembly further comprises a skin-blocking element which is adapted to prevent the skin from moving towards the first roller end past a predetermined blocking point, which skin-blocking element is arranged closer to the first roller end than to the second roller end. For example, blocking point may be in or adjacent to the gap. For example, the blocking point may be between first roller end and second roller end next to first roller or in gap. For example, the blocking point may be above first skinning roller. For example, the skin-blocking element may be or comprise a plate, bar and/or rod, which plate, bar and/or rod extends into a direction perpendicular to the longitudinal direction of the first skinning roller.

The skin-blocking element prevents the skin from moving all the way to the first roller end. As such, the skin-blocking element can avoid that removed skin gets stuck or accumulates in unwanted places, e.g. between the first roller end and a frame part, which could result in blockage of later removed skin and/or malfunctioning of the first skinning roller.

The invention further relates to a system for skin removal from a poultry leg product, which poultry leg product comprises a first leg end, which comprises at least a part of an ankle joint, and a second leg end opposite to the first leg end. The system comprises:
  a conveyor for conveying poultry products comprising:
  a track;
  a plurality of carriers which are moveable along said track, wherein each carrier is adapted to hold at least one poultry leg product in a position in which the first leg end is arranged at a higher level than the second leg end, a deskinning device according to the invention, which deskinning device is arranged along said track.

The system thus relates to a conveyor comprising a track along which a plurality of carrier are moveable, and a deskinning device arranged along said track. The carrier is adapted to hold the poultry leg product in a position that allows the deskinning device to operate according to the invention, i.e. pull the skin of the poultry leg product into the gap and towards the first roller end. For example, the carrier may have a slot adapted to receive the at least a part of the ankle joint, such that poultry leg product is suspended by the ankle joint. For example, the carrier may have a hook adapted to be inserted in meat of the poultry leg product, such that the poultry leg product is suspended therefrom.

In an embodiment, the system further comprises a positioner device, which is arranged along the track and adapted to position the poultry leg product relative to a deskinning device in a deskinning position, wherein in the deskinning position the poultry leg product engages at least the first skinning roller of said deskinning device. For example, the positioner device may be a guiding rod or plate, e.g. a stationary guiding rod or plate, with which the poultry leg product comes into contact as it is conveyed by the carrier along the track.

Optionally, the positioner device is arranged relative to a deskinning device such that in the deskinning position a contact pressure is caused between the poultry leg product and at least the first skinning roller of said deskinning device.

In an embodiment, the conveyor is provided with a circle arc track portion, and the deskinning device comprises a carousel deskinning device which is arranged at said circle arc track portion. The carousel deskinning device comprises a main frame, and a skin removal assemblies support structure, which is journaled on said main frame to revolve about a vertical main axis. The carousel deskinning device further comprises a drive assembly adapted to cause a revolving motion of the skin removal assemblies support structure that is synchronized with the passage of the carriers along the circle arc track portion of the track. The skin removal assemblies support structure supports multiple skin removal assemblies in a circular arrangement thereon, wherein the skin removal assemblies are distributed corresponding to the positions of the poultry leg products held by the carriers of the conveyor in their passage along the circle arc track portion of the track, such that each skin removal assembly moves along with a poultry leg product during the skin removal process. The use of a carousel deskinning device allows to increase processing speed.

In embodiments, the system further comprises at least one skin collecting bin, wherein the conveyor of the skin removal assembly is embodied such that the skin collecting bin can be placed directly underneath the path of the multiple skin removal assemblies so that skin removed from the poultry part drops directly into the skin collecting bin. This also allows for a simple design as no equipment handling the skin between the skin removal assemblies and the bin is needed , e.g. no skin conveyor.

In embodiments, the system further comprises at least one skin conveyor, wherein the conveyor of the skin removal assembly is embodied such that the skin conveyor can be arranged directly underneath the path of the multiple skin removal assemblies so that skin removed from the poultry part drops directly into the skin conveyor. This allows that the skin can be conveyed to a desired location without the need of additional handling by operators or e.g. skin collection bins.

The invention further relates to multiple embodiments of a method for removing skin from a poultry leg product. The method according to the invention may be performed with the system or deskinning device according to the invention; however, neither the method nor the system or deskinning device are limited thereto. Nevertheless, features and definitions explained with reference to the method according to the invention may be interpreted similarly when mentioned in reference to the system or deskinning device, and vice versa. Furthermore, features and/or embodiments explained with reference to the method according to the invention may be added to the system or deskinning device according to the invention to achieve similar advantages, and vice versa.

The object of the invention is also achieved with a method for removing skin from a poultry leg product, which poultry leg product comprises a first leg end which comprises at least a part of an ankle joint, and a second leg end opposite to the first leg end. The method comprises the following steps:
- arranging the poultry leg in a deskinning position in which the first leg end is arranged at a higher level than the second leg end,
- bringing the poultry leg product into engagement with a first skinning roller of a skin removal assembly of a deskinning device, which first skinning roller is rotatable about an axis of rotation which extends in a longitudinal direction of the first skinning roller, which first skinning roller further comprises a first roller end and a second roller end, wherein the first roller end is arranged at a higher level than the second roller end,
- pulling skin from the poultry leg product into a gap between the first skinning roller and a counter skinning member which is arranged adjacent said first skinning roller and upwards towards the first roller end.

In accordance with the invention, the skin is pulled upwards. For example, the skin may be pulled towards the ankle joint of the poultry leg product. It has been found that the invention provides in a better skin removal, because the skin can easier be pulled loose in this direction. The skin may also be removed in a more predictable manner that with prior art devices. In addition, the invention allows to omit preparatory cuts or incisions, which may damage the meat.

In an embodiment of the method according to the invention, the skin is tightened at a predetermined tightening point by a skin-tightening element, which skin-tightening element is arranged closer to the first roller end than to the second roller end.

In an embodiment of the method according to the invention, the poultry leg product comprises a skin part, a leg bone and leg meat which is naturally present on said leg bone, wherein the skin part has an inner surface which before deskinning process engages the leg meat and/or the leg bone and during the deskinning process becomes disengaged from the leg meat and/or leg bone, respectively. In this embodiment, the method further comprises the step of cutting into the skin part during the deskinning process after the inner surface has become detached from the leg meat and/or leg bone, respectively. In this context, cutting into the skin includes e.g. locally weakening the skin e.g. by scoring, by a cut into but not entirely through the skin, or cut through the skin. The skin may e.g. be cut in a skin connection between skin remaining on the poultry leg product and a skin part loosened from the poultry leg product and being pulled towards the first roller, e.g. end past a predetermined tightening point.

In an embodiment of the method according to the invention, the skin is intact in circumferential direction of the poultry leg product at the initial moment when the poultry leg product is brought into engagement with a first skinning roller. That is, no circular preparatory cut at e.g. the ankle joint is made before the first skinning roller comes into contact with the poultry leg product.

In an embodiment of the method according to the invention, the skin between the first leg end and the second leg end is intact in longitudinal direction of the poultry leg product at the initial moment when the poultry leg product is brought into engagement with a first skinning roller. That is, no longitudinal cut, e.g. along the drumstick and/or thigh, is made before the first skinning roller comes into contact with the poultry leg product.

The direction of in which the skin is pulled in accordance with the invention allows, in some embodiments in combination with the tightening member and/or the skin cutter, to omit such circular and/or longitudinal preparatory cuts, contrary to prior art devices. Consequently, disadvantages associated with such preparatory cuts are avoided. Said disadvantages may e.g. include that the cut is too deep and damages the meat and/or tendons below the skin, which may result in yield loss and/or visually unpleasing meat. Other disadvantages entail that the circular preparatory cut should ideally be completely around the leg, and that the circular and the longitudinal preparatory cut should be connected, which in practice is not always easily achievable, e.g. due to natural variations in the size of the poultry leg product. When these requirements are not met in practice, the result may not be satisfactory.

In an embodiment of the method according to the invention, the poultry leg product is a drumstick or a whole leg poultry product.

In an embodiment of the method according to the invention, use is made of a deskinning device according to the invention.

Exemplary embodiments of the invention will now be described with reference to the figures, in which same reference numerals along various figures indicate the same features.

Figure 1B:
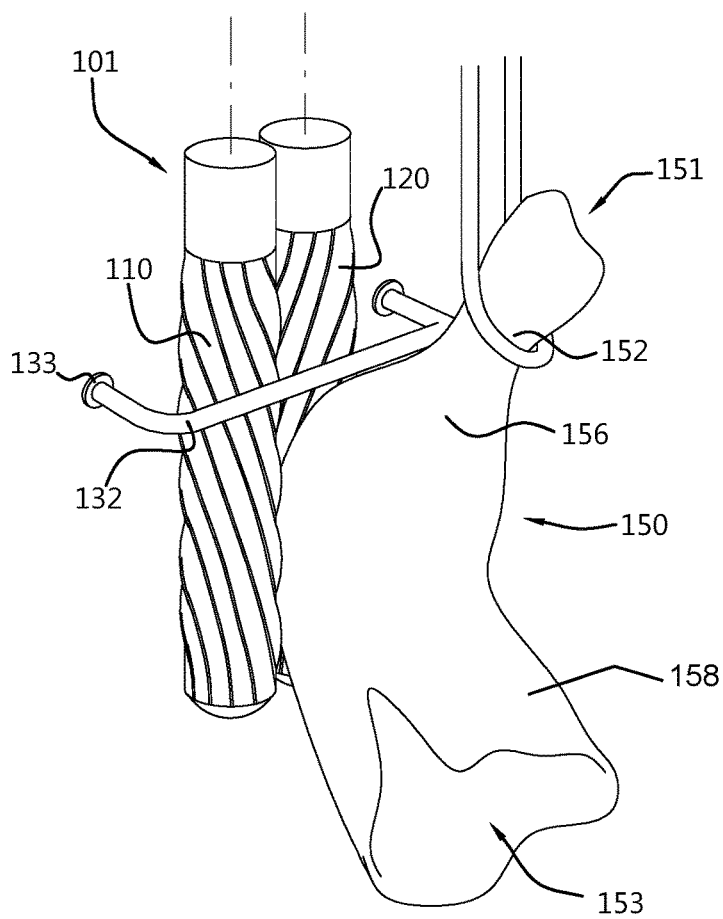
Figure 1C:
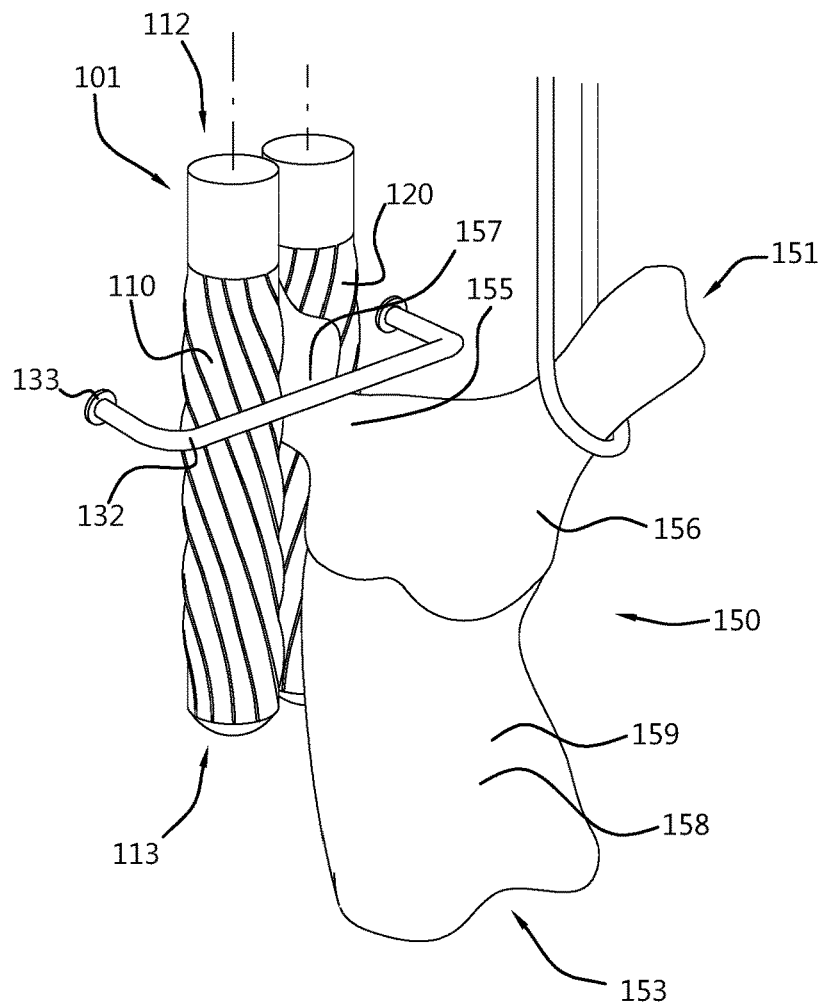
Figure 1D:
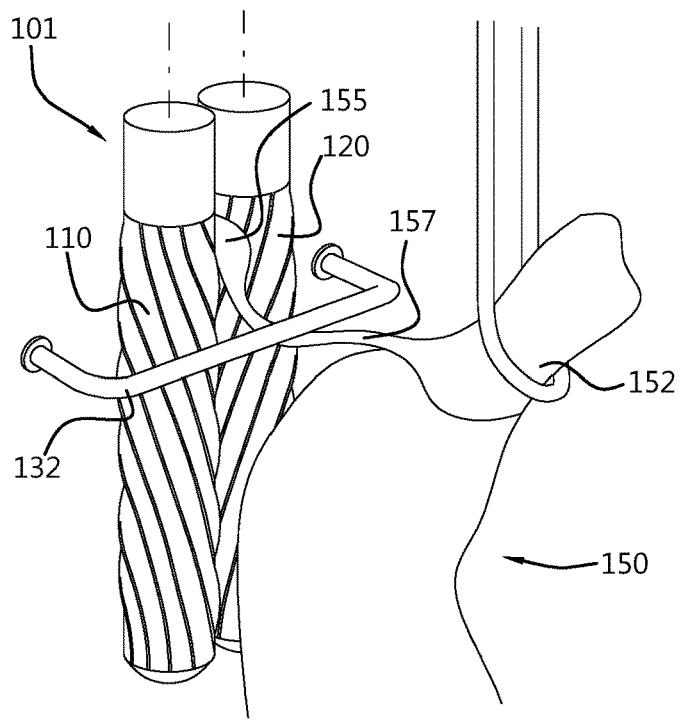
Figure 2A:
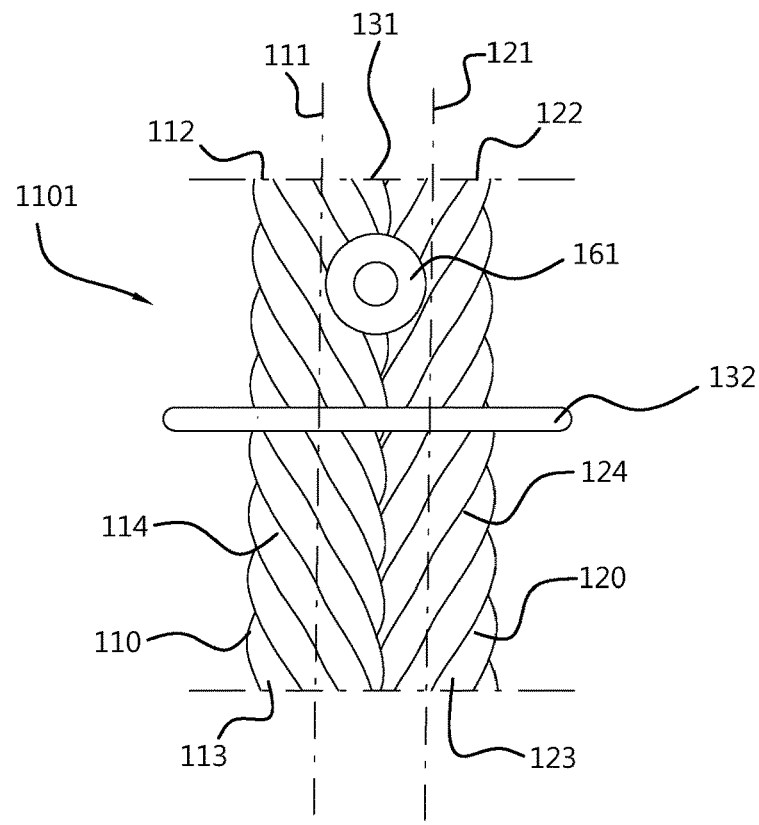
Figure 2B:
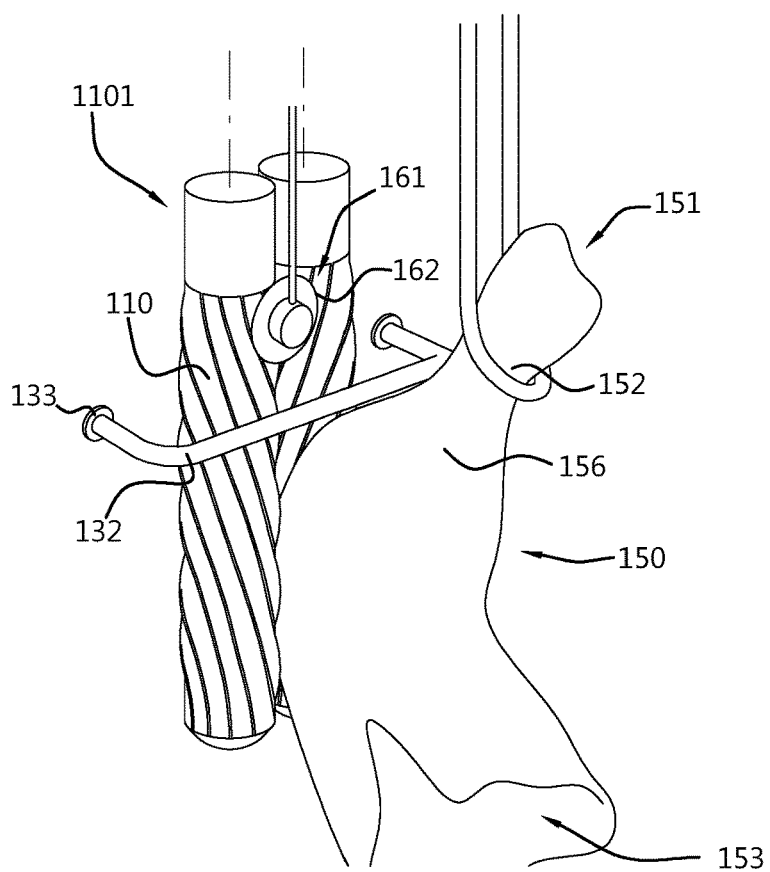
Figure 3:
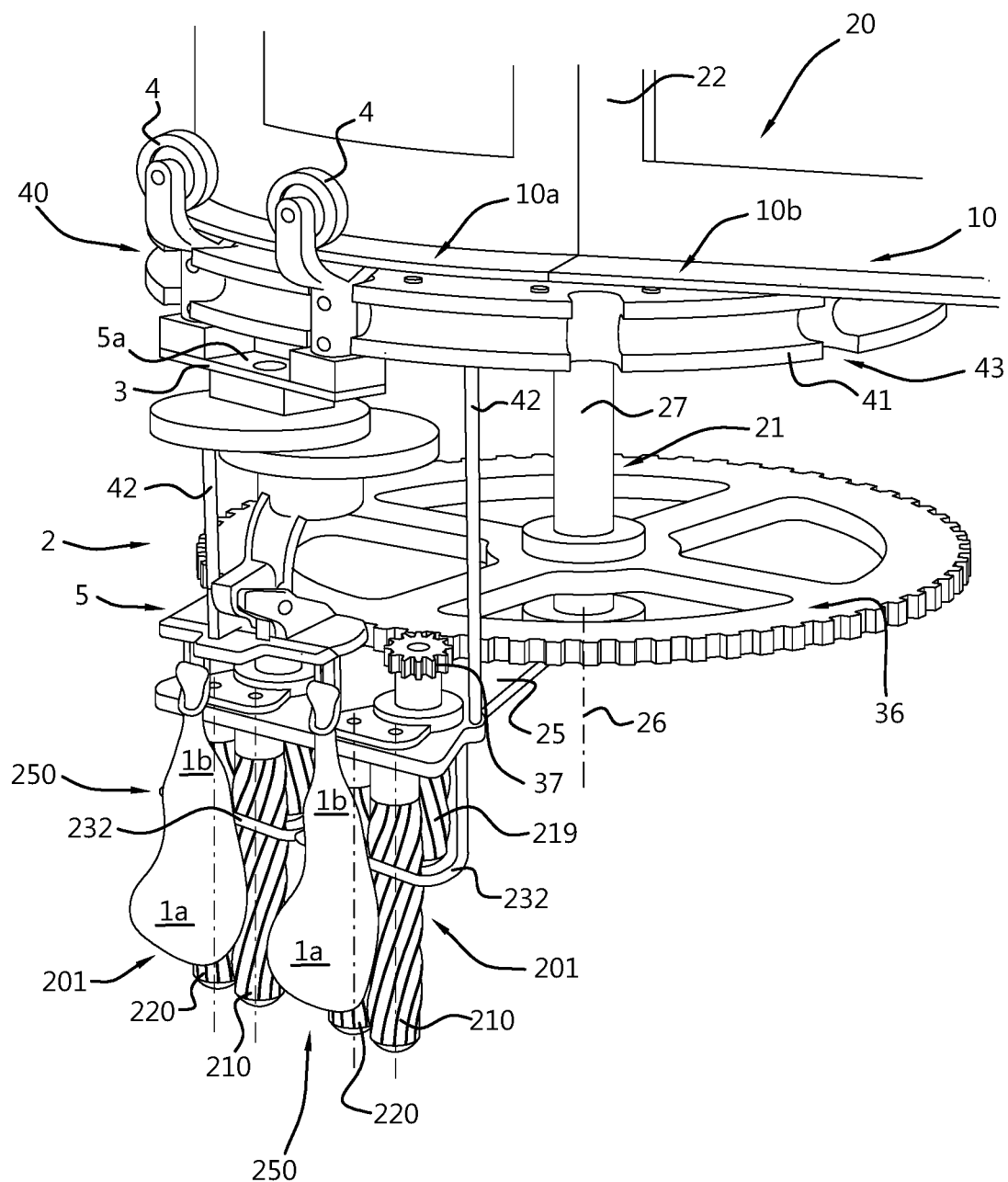
Figure 4:
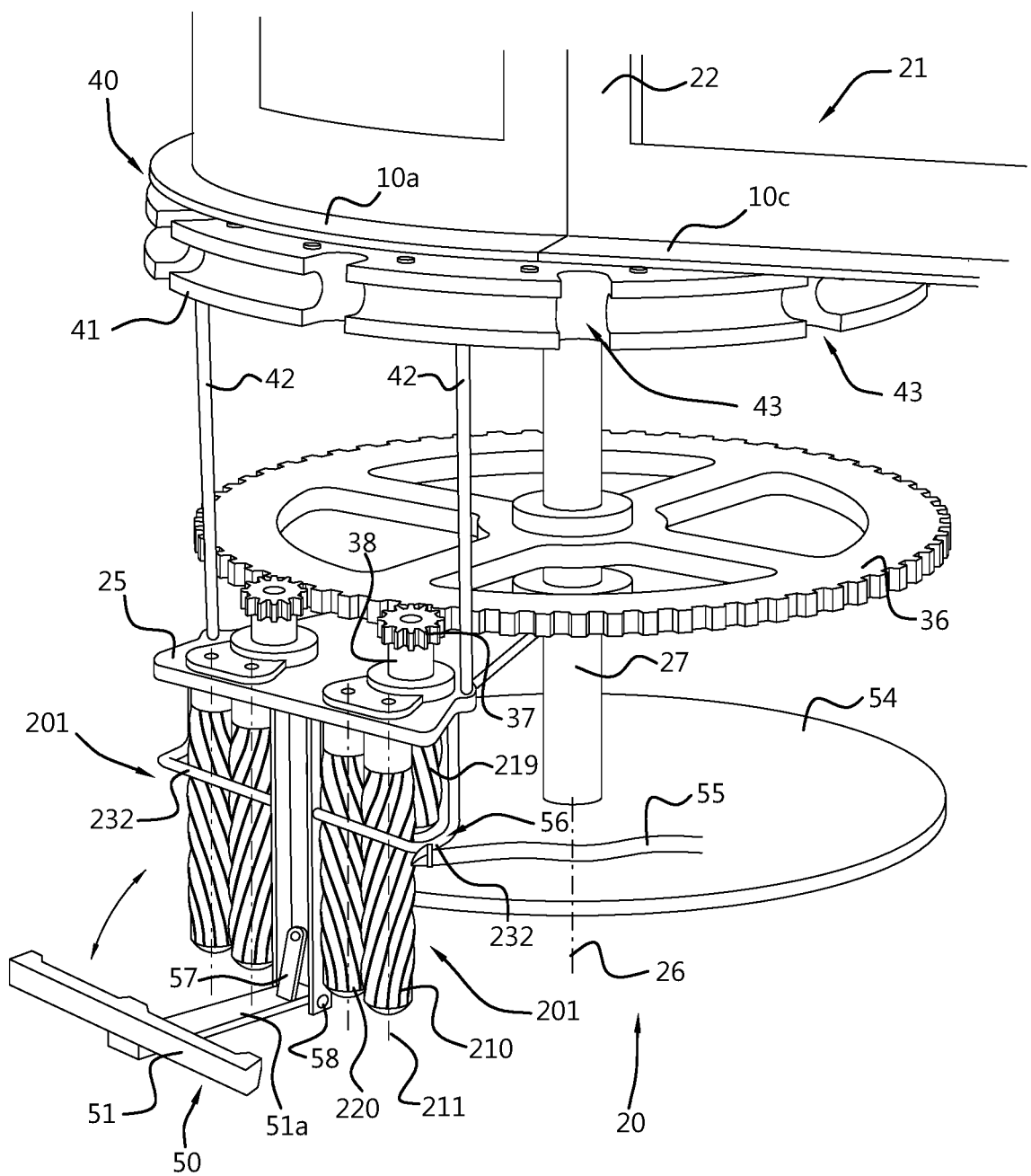
Figure 5:
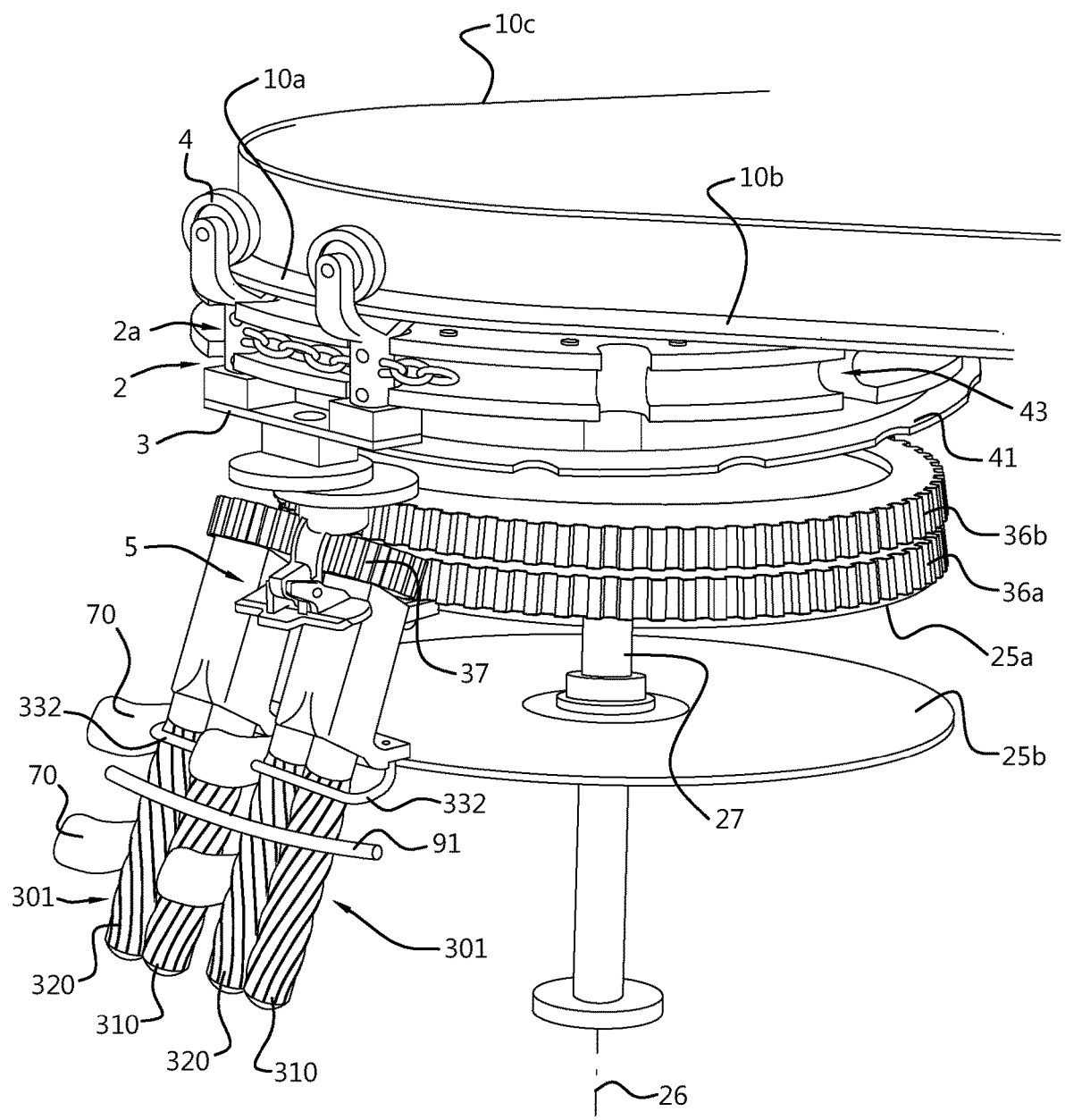

In the figures:

FIG. 1a: shows a front view of a first embodiment of a skin removal assembly;

FIG. 1b-1d: show a side view of the skin removal assembly and a poultry leg product;

FIGS. 2a and 2b: show a second embodiment of the skin removal assembly, in front view and side view, respectively;

FIG. 3: shows a system for skin removal from a poultry leg product;

FIG. 4: shows an embodiment of the deskinning device that further comprises multiple pressing devices;

FIG. 5 shows another embodiment of system for skin removal from a poultry leg product.

FIG. 1a-1c illustrate the working principle of the invention, wherein for the sake of clarity only elements required for explaining said working principle are shown. FIG. 1a shows a front view of a skin removal assembly 101, which may be part of a deskinning device, comprising a first skinning roller 110. The first skinning roller 110 is rotatable about an axis of rotation 111, e.g. by means a first skinning roller drive (not shown). In the shown embodiment, the first skinning roller 110 comprises helical grooves 114 for gripping skin of a poultry product, but other embodiments are possible, e.g. the first skinning roller 110 may be provided with teeth.

A counter skinning member embodied as a second skinning roller 120 is provided adjacent to the first skinning roller 110, but other embodiments are possible, e.g. the counter skinning member being embodied as a shoe or pinch block. The second skinning roller 120 also comprises helical grooves 124 and is also rotatable about an axis of rotation 121. In the shown example said axis of rotation 121 which is parallel to the axis of rotation 111 of the first skinning roller 110, but this is not required, e.g. when the first 110 and second skinning roller 120 are conical. The first 110 and second skinning roller 120 are arranged to rotate in opposite direction during use. During rotation of the first 110 and second skinning roller 120 their respective helical grooves 114, 124 are meshing, such that skin of a poultry product is pulled into a gap 131 between the first 110 and second skinning roller 120. A skin removal force can be exerted on the skin that has a significant upward component, so that the skin pulling action includes a significant upward force.

FIG. 1a further shows that the first skinning roller has a first roller end 112 and a second roller end 113. The first roller end 112 is arranged at a higher level than the second roller end 113. Similarly, the second roller 120 has a first roller end 122 and a second roller end 123, the first roller end 122 being arranged at a higher level than the second roller end 123.

An optional skin-tightening element 132 is also visible in FIG. 1a-1c, which in this case is embodied as a rod. However, other embodiments, such as a plate or bar, are also possible. Preferably, the skin-tightening element 132 extends in a direction substantially perpendicular to the axis of rotation 111 of the first skinning roller 110. The skin-tightening element 132 is arranged closer to the first roller end 112 than to the second roller end 113.

FIG. 1b shows a side view of the skin removal assembly 1 and a poultry leg product 150. In the shown example, the poultry leg product 150 includes a drumstick 156 and a thigh 158, but is also possible that the poultry leg product 150 only comprises the drumstick 156. The poultry leg product 150 comprises a first leg end 151 which comprises at least a part of an ankle joint 152, and a second leg end 153 opposite to the first leg end 151. The first leg end 151 is arranged at a higher level than the second leg end 153. As can further be seen in FIG. 1b, the poultry leg product 150 preferably is not provided with any longitudinal or circumferential preparatory cuts. The skin is intact is circumferential and longitudinal direction.

FIG. 1b shows a situation where the first 110 and second skinning roller 120 engage and grip the skin of the poultry leg product 150. FIG. 1c shows a situation where a skin part 155 has been pulled loose from the poultry leg product 150. In both of FIG. 1b and FIG. 1c, the poultry leg product 150 is in a deskinning position. FIG. 1c further shows leg meat 159, which is naturally present on a leg bone of the poultry leg product 150. In the shown example, the leg bone is not visible because it is covered by the leg meat 159. The skin part 155 further has an inner surface, which before deskinning process engages the leg meat 159 and/or the leg bone. Thus, during the deskinning process the inner surface of the skin part 155 becomes disengaged from the leg meat 159 and/or leg bone, respectively.

As can be seen, the skin removal assembly 1 is adapted to pull the skin of the poultry leg product 150 into the gap 131 and towards the first roller end 112. In the shown embodiment, this is accomplished by the design of the helical grooves 114, 124 (FIG. 1a) of the first 110 and second skinning roller 120, but other embodiments are possible. By pulling the skin towards the first roller end 112 which is arranged at a higher level than the first roller end, it can be advantageously achieved that any longitudinal or circumferential preparatory cuts can be omitted.

FIG. 1c further shows that the skin part 155 is pulled under the skin-tightening element 132. As the skin is pulled to a higher level than the skin-tightening element 132, past a predetermined tightening point 133, the skin-tightening element 132 causes a skin connection 157 between the skin remaining on the poultry leg product 150 and the skin part 155 to be pulled tight. Said skin connection 157 is held under a pulling force. This allows to detach the skin from the poultry leg product 150.

One way of detaching the skin from the poultry leg product 150 is illustrated in FIG. 1d. In this embodiment, the poultry leg product 150 is simply moved away from the skin removal assembly 1. As the skin part 155 is still being pulled by first skinning roller 110, an increasing pulling force is exerted on the skin connection 157, until eventually the skin breaks. It has been found by the inventors, that advantageously the location where the skin breaks with the skin removal assembly according to the invention, is relatively close the ankle joint 152. In addition, said location is determined primarily by the anatomy of the poultry leg product 150, meaning that it is less affected by natural variations of the poultry leg product 150 than prior art devices.

FIG. 2a and FIG. 2b illustrate another way in which the skin can be detached from the poultry leg product 150. A skin removal assembly 1101 is shown which comprises the same features as the skin removal assembly shown in FIG. 1a-1d. In addition, the skin removal assembly 1101 in FIG. 2a-2b comprises a skin cutter 161, which in the shown example is arranged adjacent to the skin-tightening element 132. The skin cutter 161 comprises a cutting edge 162, embodied as a circular blade. The cutting edge 162 is arranged closer to the first roller end 112 than to the second roller end 113 of the first skinning roller 110. The skin cutter also comprises a skin cutter drive (not shown) for moving the cutting edge 162 towards the skin connection (not shown in FIG. 2a-2b for the sake of clarity). As the skin part is moved further upwards by the first 110 and second skinning roller 120, the skin connection is held tight by the skin-tightening element 132. Once enough skin has been pulled loose from the poultry leg product 150, the skin cutter drive is adapted to move the cutting edge 162 towards the skin connection. The cutting edge 162 engages the skin part and/or skin connection, and cuts through it. The skin connection and the skin part are as such detached from the poultry leg product 150. The skin cutter 161 can e.g. be adapted to cut the skin between the tightening element 132 and the first skinning roller 110 and/or second skinning roller 120, or between the tightening element 132 and the poultry leg 150. In some embodiments it may be preferred to cut between the tightening element 132 and the poultry leg 150 because this results in less loose skin, which may be more visually pleasing.

During the entire deskinning process, the leg meat 159 remains at a safe distance from the cutting edge 162. The cutting edge 162 thus only cuts into the skin part and/or skin connection, and does not sever the leg meat 159. Therefore, the resulting leg meat will remain visually pleasing.

FIG. 3 shows a system for skin removal from a poultry leg product, comprising a deskinning device with a skin removal assembly according to the invention. The shown example is a carousel arrangement, but a linear arrangement is equally possible.

The system comprises conveyor for conveying poultry products comprising a track 10 having a circle arc track portion 10a, here a semi-circle arc track portion 10a adjoining straight track portions 10b respectively upstream and downstream of track portion 10a.

Although FIG. 3 only shows a single carrier 2 for the sake of clarity, it will be appreciated that the conveyor comprises a series of carriers 2 which are spaced apart from one another in the direction of the track and which are movable along the track 10. For example, the carriers 2 are connected to a chain, which chain is driven by a motor drive, preferably at a constant speed of conveyance.

As is known in the art each carrier 2 is adapted to hold at least one poultry leg product 250 at the ankle joint thereof such that the poultry product 250 is conveyed hanging from said carrier 2. For example, reference is made to US15150156157.

As is preferred, each carrier 2 comprises a carrier base 3 that is guided, here embodied as a trolley having track engaging rollers 4, along the track 10 and a holding part 5 that is adapted to hold poultry leg products 250 at the ankle joint in side-by-side hanging orientation. For example, a left and a right poultry leg can be arranged side-by-side. The holding part 5 may comprises two leg receiving openings therein, possibly and preferably provided with a commendable retention mechanism to keep the leg in the receiving opening with the ankle joint above the holding part and the whole leg or drumstick suspended below the holding part 5.

The holding part 5 is rotatable mounted relative to the carrier base about a vertical axis between indexed rotary positions which include a first rotary position, wherein the holding part 5 is transverse to the track 10, and a second rotary position, wherein the holding part is aligned with the track 10. As is known in the art, a locking mechanism may be present on the carrier 2 to lock the holding part 5 in one or more of its rotary positions.

The system further comprises a deskinning device 20 that is arranged along the track 10, in this example at the circle arc portion 10a, of the conveyor. This deskinning device 20 is adapted to remove skin from poultry leg products 250 held and conveyed by the conveyor.

The deskinning device 20 comprises a main frame 21, here with a cantilevered frame part 22 that supports the arc track portion 10a at an overhead position and with one or more legs that support the frame part 22 on the floor.

The device 20 further comprises a skin removal assemblies support structure 25, which is journaled on the main frame 21 to revolve about a vertical main axis 26. As is preferred the main frame 21 has a vertical shaft 27 depending from the cantilevered frame part 22. The lower end of the shaft may be spaced above the floor to allow a skin collecting bin to pass underneath the shaft and to be arranged so as to collect the removed skin therein.

The revolving support structure 25 supports multiple pairs of skin removal assemblies 201, wherein each skin removal assembly is adapted to remove skin from a poultry leg product 250. The skin removal assembly 201 functions as explained with reference to FIGS. 1a-2b. The position of the first 210 and second skinning roller 220 relative to the poultry leg product 250 is inversed relative to FIGS. 1a-2b, but this does not affect the working principle of the invention. As can further be seen, two skin removal assemblies 201 are arranged to cooperate with each carrier 2, such that both poultry leg products 250 can be skinned. The first skinning roller drive 219 is also visible in FIG. 3, as is the skin-tightening element 232.

Although only two skin removal assemblies 201 and one corresponding carrier 2 are shown for sake of clarity, the skilled person will appreciate that a plurality may be provided in the carousel arrangement.

The device 20 comprises a drive assembly 40 that is adapted to cause a revolving motion of the skin removal assemblies support structure 25 that is synchronized with the passage of the carriers 2 along the circle arc track portion 10*a* of the track 10.

In the figures, a drive assembly 40 is shown comprises a rotary conveyor coupling member 41 that is secured to the skin removal assemblies support structure 25, here via one or more rods 42 between the coupling member 41 and the lower arranged structure 25.

The conveyor coupling member 41 is rotatable about the vertical main axis 26 of the device 20 and is provided with formations 43 in a circular arrangement, which formations 43 (here indents in an outer circumference of a circular coupling member), interlock with a carrier 2 so that the conveyor coupling member 41, and thereby the skin removal support structure 25, is entrained by the passing carriers and made to revolve about the vertical main axis.

It will be appreciated that each skin removal assembly 201 moves along with a poultry leg product 250 during the skin removal process which takes place during the passage along the arc portion 10*a*.

Although not shown in FIG. 3, it will be appreciated that the skin can be completely detached from the poultry leg product 250 by moving the poultry leg product 250 away from the skin removal assembly 201, as explained with reference to FIG. 1*d*. It is also possible to provide a skin cutter. Said skin cutter may be provided for each individual skin removal assembly 201, as explained with reference to FIG. 2*a*-2*b*. It is also possible to provide a single, stationary skin cutter along the track of 10, such that each skin removal assembly 201 passes said stationary skin cutter, which then cuts through the skin connection.

The main frame 21 of the carousel deskinning device 20 comprises a gear ring 36. Here—as is preferred—this gear ring 36 is stationary mounted in the main frame 21, here on shaft 27.

Each skin removal assembly 30 comprises a pinion 37 meshing with the gear ring 36, which one pinion 37 is connected to the first skinning roller 210 of the skin removal assembly 30. In the embodiment shown here each pinion 37 is fitted on a shaft 38 that carries the first skinning roller drive 219 meshing with the first skinning roller 110.

FIG. 4 shows an embodiment of the deskinning device 20 that further comprises multiple pressing devices 50 that are supported by a pressing devices support structure 25 in a circular arrangement thereon. The poultry leg products are omitted in FIG. 4 for the sake of clarity. In this embodiment, one pressing device 50 is provided per pair of skin removal assemblies 201. Also in this embodiment, the pressing devices 50 are mounted on the structure 25 so that said structure also acts as pressing devices support structure. Thereby this support structure for the pressing devices 50 is also journaled on the main frame to revolve about the vertical main axis and is adapted to revolve synchronized with the skin removal assemblies support structure.

Generally each pressing device 50 is adapted to cause a contact pressure between—on the one hand—two poultry leg products held by a carrier 2 of the conveyor whilst passing along the circle arc track portion 10*a* of the track and—on the other hand—the skinning rollers of a skin removal assembly 201.

Each pressing device 50 includes a pressing member 51 that is here embodied to engage on two poultry leg products held by a single carrier 2. The pressing members 51 are generally arranged radially outward of the skin removal assemblies 201, so that the skin removal assemblies 201 each are arranged to contact a first side of the poultry leg product and each pressing member 51 is adapted to directly engage on an opposed second side of the poultry leg product. Thus, the pressing members 51 effectively press the poultry leg products radially inward onto the corresponding skin removal assemblies 201.

The pressing members 51 are embodied as mobile pressing members, each adapted to engage directly on the poultry leg product. For each pressing member 51 a corresponding actuator is provided in the device 20, which is adapted to move the pressing member between a retracted position and an active pressing position.

In the figures, it can be seen that in an embodiment the actuation of the pressing member is based on a cam/cam follower mechanism. Here a stationary cam disc 54 is mounted in the main frame at a level below the support structure 25, with the disc 54 having a cam track 55. The pressing device 50 includes a cam follower 56 that engages the cam track 56 and that is linked by a mechanical linkage 57 to the mobile pressing member 51.

Here the pressing member 51 has an arm 51*a* that is at a lower end thereof pivotally connected to the support about a horizontal pivot axis 58.

It is noted that in embodiments where the skin removal assembly 201 comprises a skin cutter, movement of said skin cutter relative to the poultry leg product may be accomplished with a similar cam follower and cam track as is provided for movement of the pressing device 50.

With reference to FIG. 5 now another embodiment of a system according to the invention will be discussed. Parts having the same function as parts discussed with reference to the FIG. 4 have been denoted with the same reference numerals. It will be appreciated that whilst only two assemblies 301 are shown (for clarity), the carousel device will be equipped with several pairs of assemblies 301 around its circumference.

It is illustrated here that the axes of rotation of the first and second skinning roller 310, 320 extend upward and inward at an angle of between 45° and 80° to the horizontal, preferably at an angle of between 60° and 80° to the horizontal. In other words, the angle to the vertical is 45° or less. This inclined orientation of the skinning rollers 310, 320, which—in this example—are of generally cylindrical design with meshing helical teeth thereon as is preferred, allows for enhanced engagement of the poultry leg product with the first and second skinning rollers 310, 320.

FIG. 5 further illustrates the provision of one or more poultry product positioning members 70, preferably stationary mounted relative to each assembly 301, which serve to assist in the positioning of the poultry leg product relative to the assembly 301, here relative to the first and second skinning roller 310, 320.

It is illustrated here to provide such a member 70 at the trailing side of the pair of skinning rollers, such that it provides support for a poultry leg product to keep the poultry leg product aligned with the first and second skinning roller 310, 320.

FIG. 5 also illustrates the provision of one or more positioner devices, here embodied as arc shaped rods 91 that are arranged in an arc along a section of the deskinning device 20. The one or more rods 91 urge the poultry leg products onto the skin removal assemblies 301 as the poultry leg products slide along the rod(s). In another embodiment of a stationary mounted pressure device, one can envisage a resiliently mounted pressure plate or disc that is arranged in the path of the passing poultry parts and that urges the poultry leg part into intimate contact with the deskinning assembly as the part passes the pressure plate or disc.

As required, this document describes detailed embodiments of the present invention. However, it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

What is claimed is:

1. A deskinning device for removing skin from a poultry leg product, wherein the poultry leg product comprises a first leg end which comprises at least a part of an ankle joint, and a second leg end opposite to the first leg end, wherein the first leg end is arranged at a higher level than the second leg end, the device comprising:
    at least one skin removal assembly which is adapted to carry out a deskinning process, wherein the skin removal assembly comprises:
        a first skinning roller which is rotatable about an axis of rotation which extends in a longitudinal direction of the first skinning roller, which first skinning roller further comprises a first roller end and a second roller end, wherein the first roller end is arranged at a higher level than the second roller end,
        a counter skinning member which is arranged adjacent said first skinning roller, and
        a gap between the first skinning roller and the counter skinning member,
        wherein the skin removal assembly is adapted to pull the skin of the poultry leg product into the gap and towards the first roller end, and
        wherein the skin removal assembly further comprises a skin-tightening element which is adapted to cause a skin connection between skin remaining on the poultry leg product and a skin part removed from the poultry leg product and being pulled towards the first roller end past a predetermined tightening point, to be pulled tight, wherein the skin-tightening element is arranged closer to the first roller end than to the second roller end.

2. The device according to claim 1, wherein the skin-tightening element is or comprises a plate, bar, and/or rod, wherein the plate, bar, and/or rod extends into a direction perpendicular to the longitudinal direction of the first skinning roller.

3. The device according to claim 1, wherein the skin removal assembly further comprises a skin cutter which comprises a cutting edge, which cutting edge is arranged closer to the first roller end than to the second roller end of the first skinning roller.

4. The device according to claim 3, wherein the poultry leg product comprises a skin part, a leg bone and leg meat which is naturally present on said leg bone, wherein the skin part has an inner surface which before deskinning process engages the leg meat and/or the leg bone and during the deskinning process becomes disengaged from the leg meat and/or leg bone, respectively, and wherein the cutting edge of the skin cutter is arranged relative to the first skinning roller such that the cutting edge engages the skin part during the deskinning process after the inner surface has become detached from the leg meat and/or leg bone, respectively.

5. The device according to claim 3, wherein the skin cutter and the skin-tightening element are arranged adjacent to each other.

6. The device according to claim 1, wherein the axis of rotation of the first skinning roller extends in a direction which is at an angle relative to the vertical, which angle is 45° or less.

7. The device according to claim 1, wherein the skin removal assembly further comprises a pressing device adapted to cause a contact pressure between the poultry leg product and the skinning roller and/or the counter skinning member.

8. The device according to claim 1, wherein the counter skinning member is a second skinning roller rotatable about an axis of rotation which extends in a longitudinal direction of the second skinning roller, and wherein the axis of rotation of the first skinning roller and the axis of rotation of the second skinning roller are parallel to each other, and wherein at least one of the first skinning roller and the second skinning roller is provided with a gripper ridge.

9. A system for skin removal from a poultry leg product, wherein the poultry leg product comprises a first leg end which comprises at least a part of an ankle joint, and a second leg end opposite to the first leg end, wherein the system comprises:
    a conveyor for conveying poultry products comprising:
        a track;
        a plurality of carriers which are moveable along said track, wherein each carrier is adapted to hold at least one poultry leg product in a position in which the first leg end is arranged at a higher level than the second leg end, and
    a deskinning device according to claim 1, which deskinning device is arranged along said track.

10. The system according to claim 9, further comprising:
    a positioner device which is arranged along the track and adapted to position the poultry leg product relative to a deskinning device in a deskinning position in which the poultry leg product engages at least the first skinning roller of said deskinning device, wherein the positioner device is arranged relative to a deskinning device such that, in the deskinning position, a contact pressure is caused between the poultry leg product and at least the first skinning roller of said deskinning device.

11. A method for removing skin from a poultry leg product, wherein the poultry leg product comprises a first leg end which comprises at least a part of an ankle joint, and a second leg end opposite to the first leg end, the method comprising:
    arranging the poultry leg product in a deskinning position in which the first leg end is arranged at a higher level than the second leg end, bringing the poultry leg product into engagement with a first skinning roller of a skin removal assembly of a deskinning device, which first skinning roller is rotatable around an axis of rotation which extends in a longitudinal direction of the first skinning roller, which first skinning roller further comprises a first roller end and a second roller end, wherein the first roller end is arranged at a higher level than the second roller end, and pulling skin from the poultry leg product into a gap between the first skinning roller and a counter skinning member which is arranged adjacent said first skinning roller and upwards towards the first roller end, and wherein the skin is tightened at a predetermined tightening point by a skin-tightening element, which skin-tightening element is arranged closer to the first roller end than to the second roller end.

12. The method according to claim 11, wherein the poultry leg product comprises a skin part, a leg bone and leg meat which is naturally present on said leg bone, wherein the skin part has an inner surface which before deskinning process engages the leg meat and/or the leg bone and during the deskinning process becomes disengaged from the leg meat and/or leg bone, respectively, and wherein the method further comprises the step of cutting into the skin part during the deskinning process after the inner surface has become detached from the leg meat and/or leg bone, respectively.

13. The method according to claim 11, wherein the skin is intact in circumferential direction of the poultry leg product at the initial moment when the poultry leg product is brought into engagement with the first skinning roller.

14. The method according to claim 11, wherein the skin between the first leg end and the second leg end is intact in longitudinal direction of the poultry leg product at the initial moment when the poultry leg product is brought into engagement with a first skinning roller.

15. The method according to claim 11, wherein the poultry leg product is a drumstick or a whole leg poultry product.

\* \* \* \* \*